(12) United States Patent
Clesceri

(10) Patent No.: US 8,771,087 B2
(45) Date of Patent: Jul. 8, 2014

(54) TORQUE LIMITING DRIVE FOR WATERCRAFT

(76) Inventor: Michael Clesceri, Oakwood Hills, IL (US)

( * ) Notice: Subject to any disclaimer, the term of this patent is extended or adjusted under 35 U.S.C. 154(b) by 244 days.

(21) Appl. No.: 13/475,397

(22) Filed: May 18, 2012

(65) Prior Publication Data

US 2013/0306425 A1 Nov. 21, 2013

(51) Int. Cl.
*F16D 7/02* (2006.01)
*B63H 23/00* (2006.01)

(52) U.S. Cl.
USPC .............................. 464/48; 440/75

(58) Field of Classification Search
USPC ................................. 440/1; 464/48
See application file for complete search history.

(56) References Cited

U.S. PATENT DOCUMENTS

| | | | | |
|---|---|---|---|---|
| 1,632,539 A * | 6/1927 | Chilton | ............................ | 464/36 |
| 2,429,561 A * | 10/1947 | Alden | ................................ | 464/9 |
| 2,540,997 A * | 2/1951 | Schmitter | ........................ | 464/33 |
| 2,569,144 A * | 9/1951 | Benson | ............................ | 464/44 |
| 2,603,136 A * | 7/1952 | Thomas | ............................ | 172/78 |
| 2,605,850 A * | 8/1952 | Kiehaefer | .................. | 416/169 R |
| 2,630,775 A * | 3/1953 | Kiekhaefer | ....................... | 440/75 |
| 2,679,909 A * | 6/1954 | Kiekhaefer | ................ | 416/169 R |
| 2,751,987 A * | 6/1956 | Kiekaefer | ................... | 416/169 R |
| 2,872,794 A * | 2/1959 | Slomer | .......................... | 464/27 |
| 2,939,301 A * | 6/1960 | Huddle | ........................... | 464/23 |
| 2,940,283 A * | 6/1960 | Christenson et al. | ........... | 464/48 |
| 3,122,903 A * | 3/1964 | Ramsden | ........................ | 464/48 |
| 4,464,137 A * | 8/1984 | Jennings | .......................... | 464/48 |
| 4,501,570 A * | 2/1985 | Konrad | ............................ | 464/48 |
| 4,609,155 A * | 9/1986 | Garnier | ............................ | 241/30 |
| 4,617,003 A * | 10/1986 | Bober et al. | ..................... | 464/48 |
| 5,415,575 A * | 5/1995 | Karls | ................................. | 440/75 |
| 5,501,636 A * | 3/1996 | Janke et al. | ...................... | 464/48 |
| 5,551,917 A * | 9/1996 | Wood | ............................... | 464/46 |

* cited by examiner

*Primary Examiner* — Dirk Wright
(74) *Attorney, Agent, or Firm* — Knechtel, Demeur & Samlan

(57) ABSTRACT

A method and apparatus for limiting the torque from an engine to the drive train of a watercraft. A torque limiting clutch is mounted to the flywheel of the engine. The output of the clutch is connected to the drive train of the watercraft. The clutch allows all of the engine's torque to be delivered to the drive train during normal conditions and less than all of the engine's torque to be delivered to the drive train during conditions in which the drive train experiences periods of excessive force. When normal conditions return, the apparatus automatically delivers all of the engine's torque to the drive train.

8 Claims, 6 Drawing Sheets

TORQUE LIMITING DRIVE FOR WATERCRAFT

BACKGROUND AND SUMMARY OF THE INVENTION

This invention relates to power drive systems and more particularly to a torque limiting drive for stern drive watercraft.

Under ideal operating conditions, a stern drive is only subjected to an engine's rated torque for a given revolutions per minute ("RPM"). If the drive is properly matched to the engine's output, the drive should provide dependable service for its intended life. However, boats or watercraft are frequently operated in waters that cause the propeller to become aerated and then re-submerged due to wave action. By throttling, the operator attempts to control the engine from over-revving and minimize strain on the stern drive by attempting to match the revolutions of the propeller with the speed of the boat as it reenters the water.

Even with significant practice, it is unreasonable to believe that the operator can perfectly match propeller revolutions and boat speed every time. Furthermore, even "perfect" throttling cannot completely compensate for the rotational inertia of the engine/flywheel that occurs when the free-spinning propeller reenters the water and is shock loaded. Basically, a spinning propeller that is suddenly submerged will experience a large force or spike of enormous drag until the boat speed and RPMs are balanced.

Generally the engine's crankshaft, flywheel and coupler weigh more than 100 pounds and are rotating 30% to 50% faster than the propeller depending on the gear ratio of the drive. The rotational inertia of these components is the source of the shock loading on the stern drive. This excessive loading generates torque spikes in the stern drive and quickly leads to damaged gears, twisted or broken shafts and damaged housings. For most recreational boaters, stern drive repairs account for the majority of their unscheduled maintenance costs.

Applicant's invention is a method and device designed to manage the shock-induced loading of the gear sets and shafts of a marine stern drive to reduce or eliminate damage from overloading or impact with a submerged object. The invention limits the maximum torque experienced by the drive with minimal or no impact or adverse effects under normal operation. In operation, the invention operates automatically, requires no additional maintenance and is completely transparent to the boat operator.

The torque limiting clutch system replaces the existing coupler that connects the engine's flywheel to the stern drive's input shaft or driveline in staggered installations. The stock bell housing is utilized and no other modifications are required.

The invention operates in the stern drive system of a watercraft by using a torque-limiting clutch designed to momentarily slip when the torque exceeds a preset value. Since the breakaway torque rating is higher than the engine's output there will be no impact or slippage of the clutch under normal operating conditions. When the torque exceeds the pre-set value, such as when an airborne propeller re-enters the water, the shock or load to the drive spikes and the clutch slips until the propeller's revolutions synchronize with the engine, reducing the shock on the drive, which causes the clutch to no longer slip and all of the engine's torque is once again transmitted to the stern drive.

The invention is designed such that the torque required to cause the clutch to slip is nearly identical to the torque that the clutch will transmit while slipping. Essentially, the invention will always transmit the engine's torque to the drive even while protecting the drive from overloading. This unique aspect continues to apply regulated torque to the drive and will make it virtually impossible for the operator to detect the invention's operation.

Applicant's invention minimizes the possibility of the stern drive being overloaded due to the forces exerted on the drive when the propeller leaves and then re-enters the water or when subjected to impact with a submerged object. As propeller technology advances and X-dimensions are raised in search of more speed the stress on the stern drive increases dramatically. Many boaters are seeing huge gains in efficiency at cruising speeds when switching to five, six and even seven blade propellers. This gain in efficiency will instantly overload a drive when a surfacing propeller re-enters the water. The invention allows these boaters to benefit from the increased efficiency without sacrificing reliability. Furthermore, the invention can help protect the drive train from catastrophic damage should the propeller strike a submerged object, thus avoiding costly repairs.

The invention can be used on most all watercraft having a stern drive, even V hulls or catamarans with single or multiple engines. Torque values for the invention can be adjusted in the field to allow the user to match a given engine output. Obviously, if the torque ratings are adjusted to exceed the drive's rating then the advantages are reduced. Accurate engine data is required to ensure the clutch does not slip under normal conditions which would lead to excessive wear and a limited life span.

OBJECTS AND ADVANTAGES

Thus it is an object of the invention to provide a method and apparatus for reducing the forces on a stern drive system when the propeller leaves and then re-enters the water or strikes a submerged object.

A related object is to provide a method of protecting the drive system when the system has forces applied to it above a predetermined level. A related object is to provide a torque limiting clutch in the stern drive system that slips and absorbs the excess energy when a predetermined force is exerted on the system.

An advantage of applicant's invention is that it continues to provide full engine torque to the propeller during normal operation and reduced torque when sudden forces are applied to the drive system that exceed a predetermined force. Still another object is to provide a torque limiting system that operates automatically without operator intervention.

DESCRIPTION OF THE PREFERRED EMBODIMENT

Figure 1:
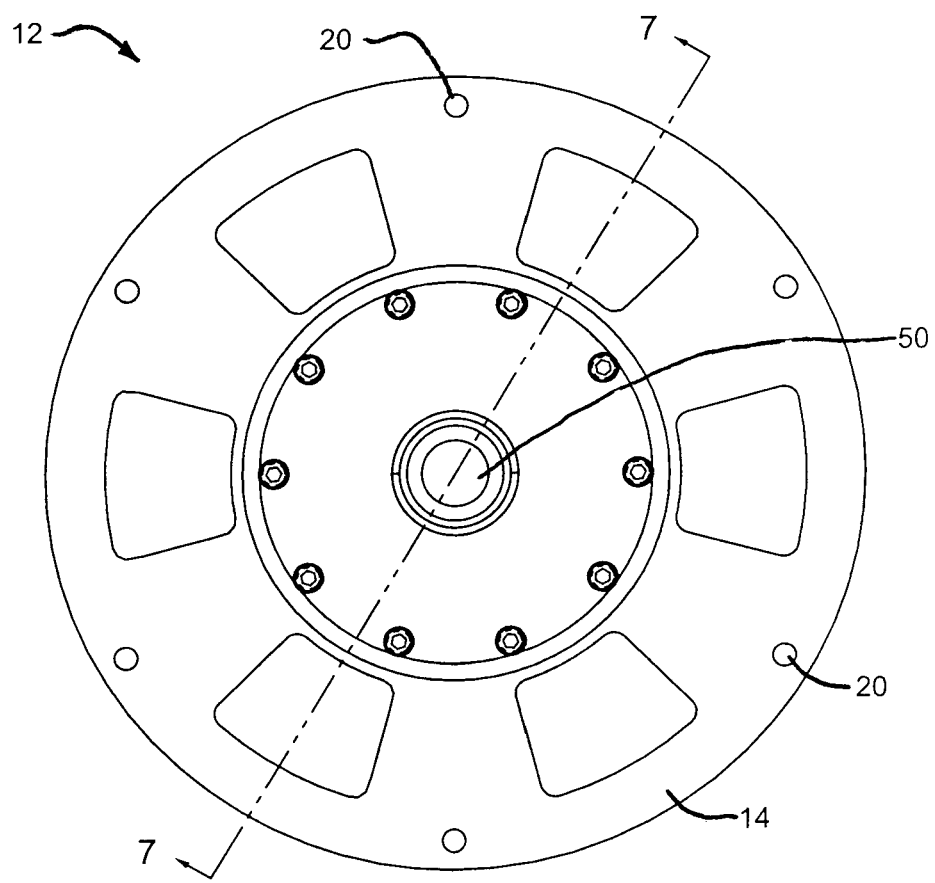
FIG. 1 is a left side elevation view of the torque limiting clutch.
Figure 2:
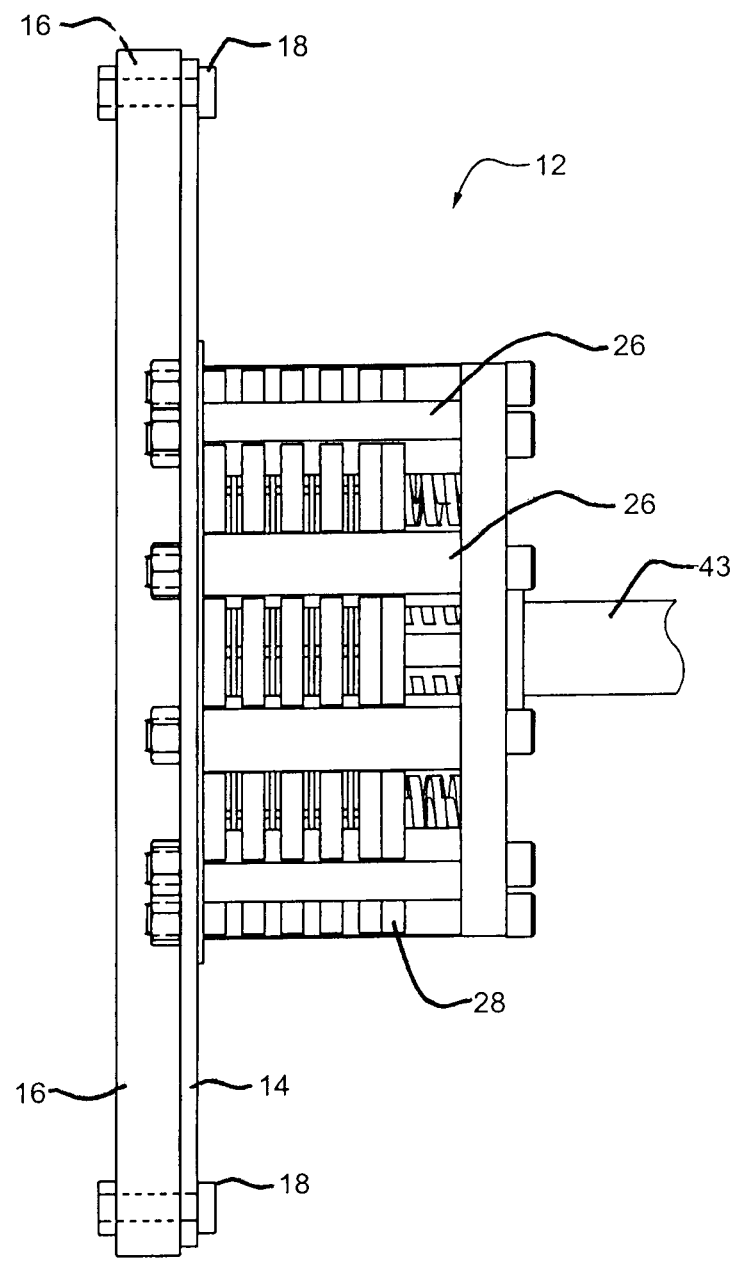
FIG. 2 is a front elevation view of the torque limiting clutch with the flywheel and drive shaft added.
Figure 3:
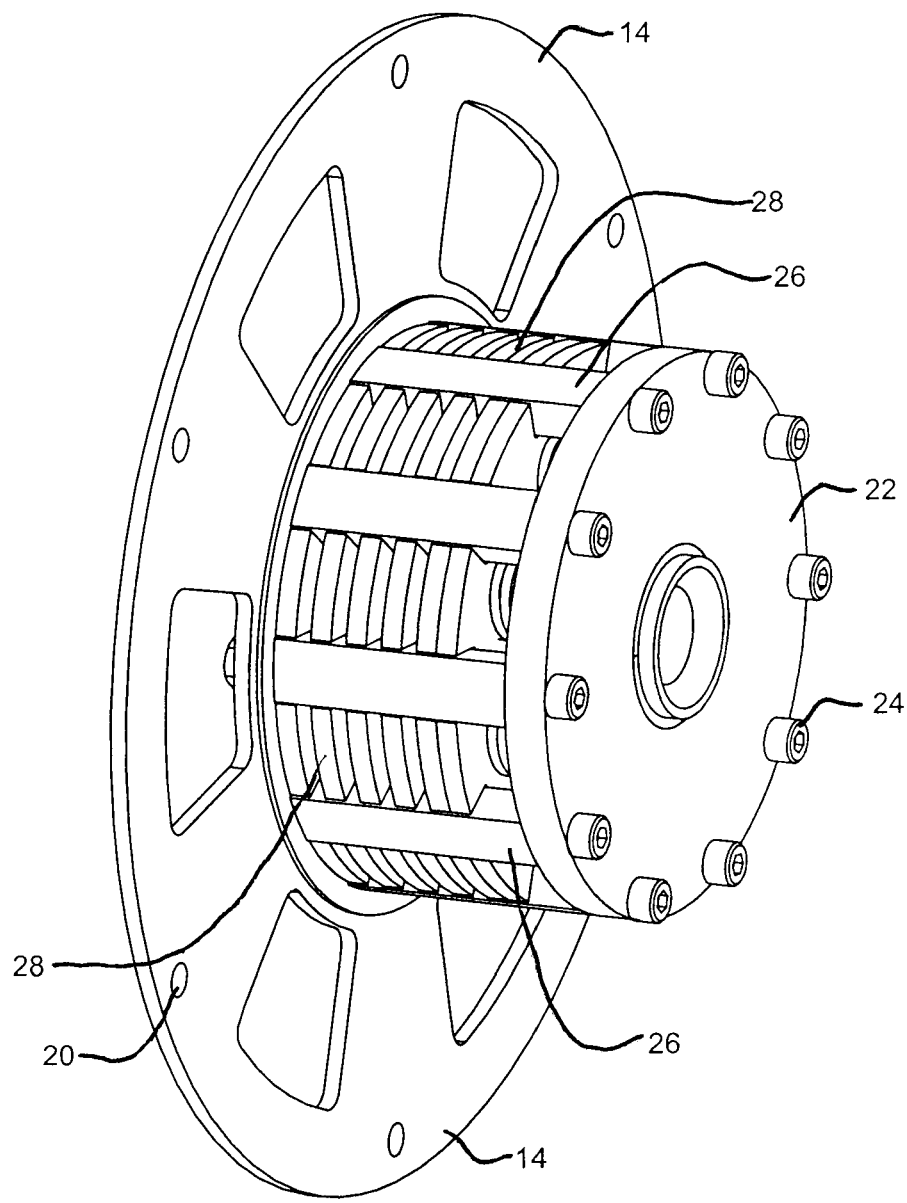
FIG. 3 is a perspective view of the torque limiting clutch used in the present invention.
Figure 4:
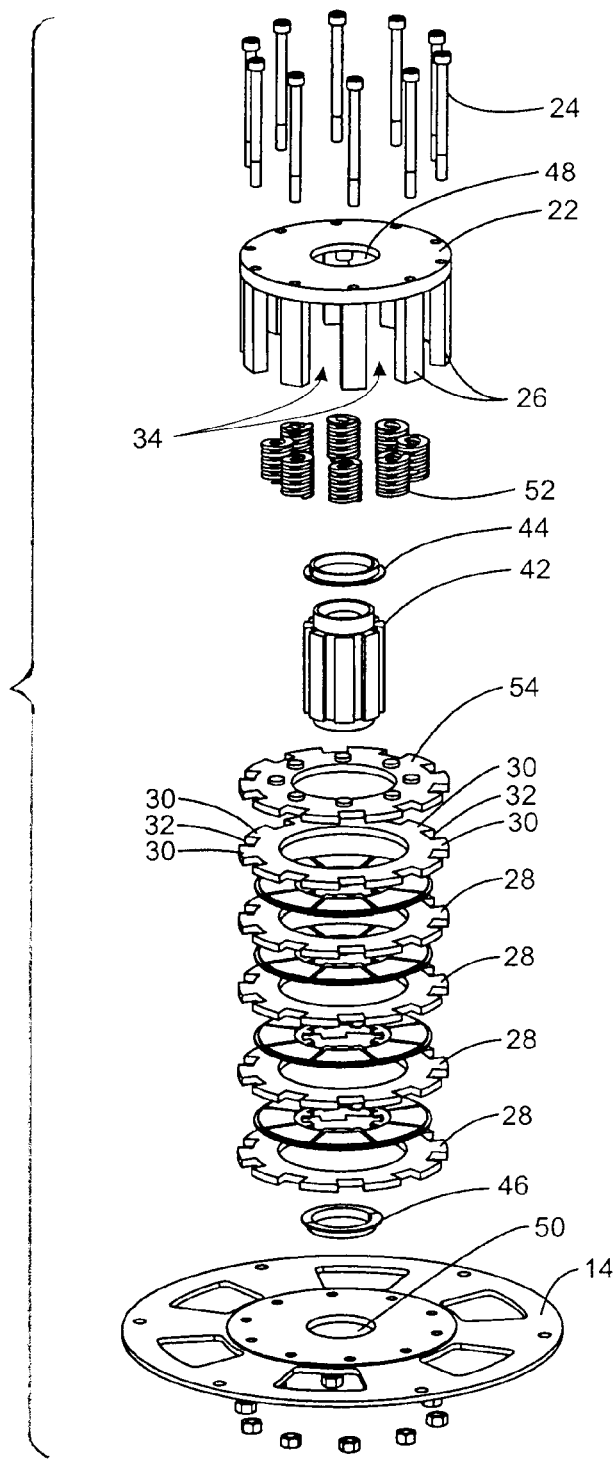
FIG. 4 is an exploded view of the torque limiting clutch.

Turning first to FIGS. 1 and 2, there is illustrated a torque-limiting clutch 12 that is used in the system of the present invention. As will be described herein, the clutch 12 converts inertia-induced torque spikes into heat from sliding friction. A backing plate 14 is attached to an engine's flywheel 16 with mounting bolts 18 that pass through holes 20 in the perimeter of the backing plate 14. A pressure plate 22 is through bolted to the backing plate 14 with ten Allen bolts 24. Each of the Allen bolts 24 pass through a drive bars 26 that maintain the pressure plate 22 a predetermined distance from the backing plate 14.

Figures 5, 6:
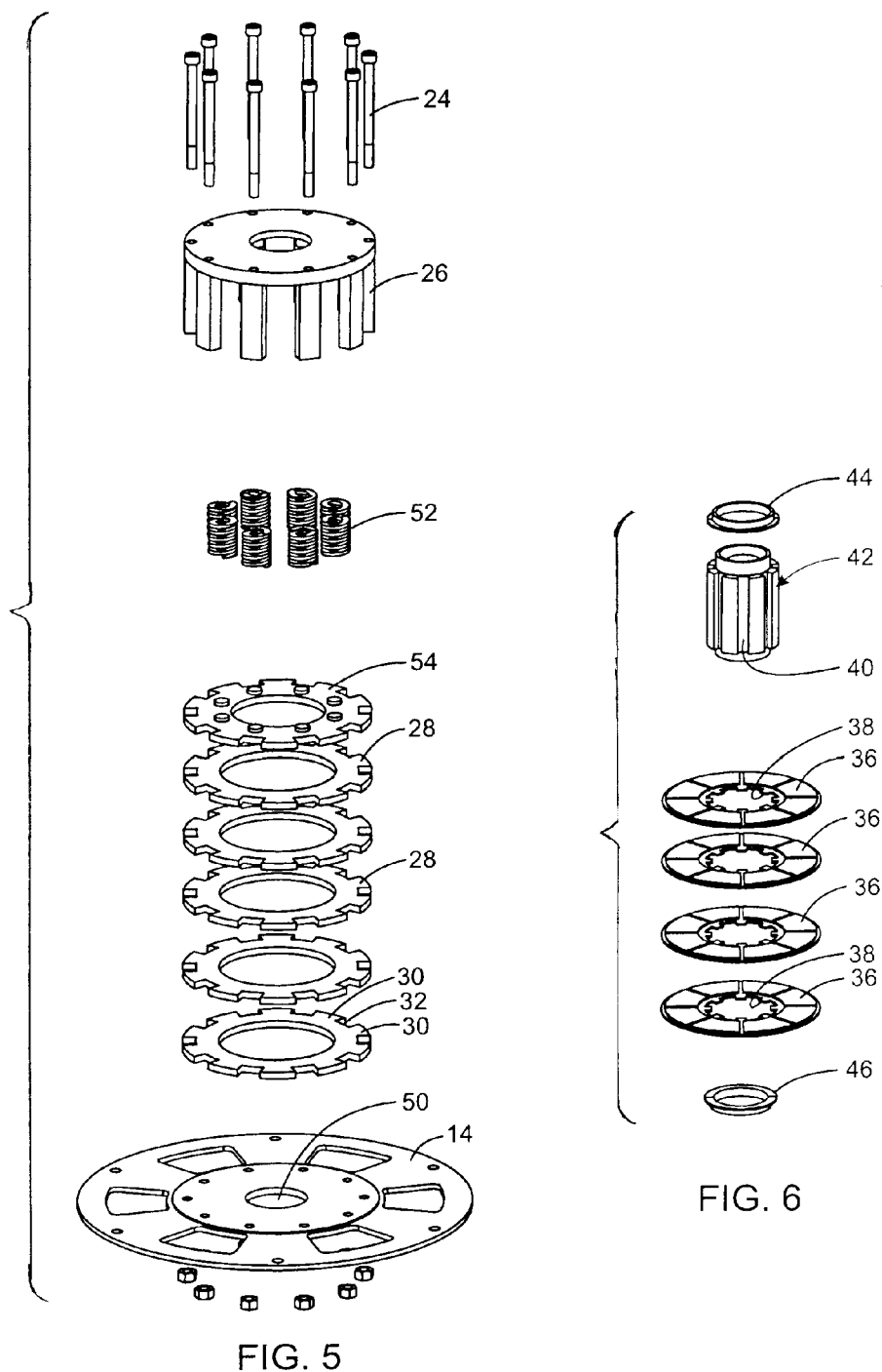
FIG. 5 is an exploded view of the drive components of the torque limiting clutch.
FIG. 6 is an exploded view of the rotating or slip components of the torque limiting clutch.
Figure 7:
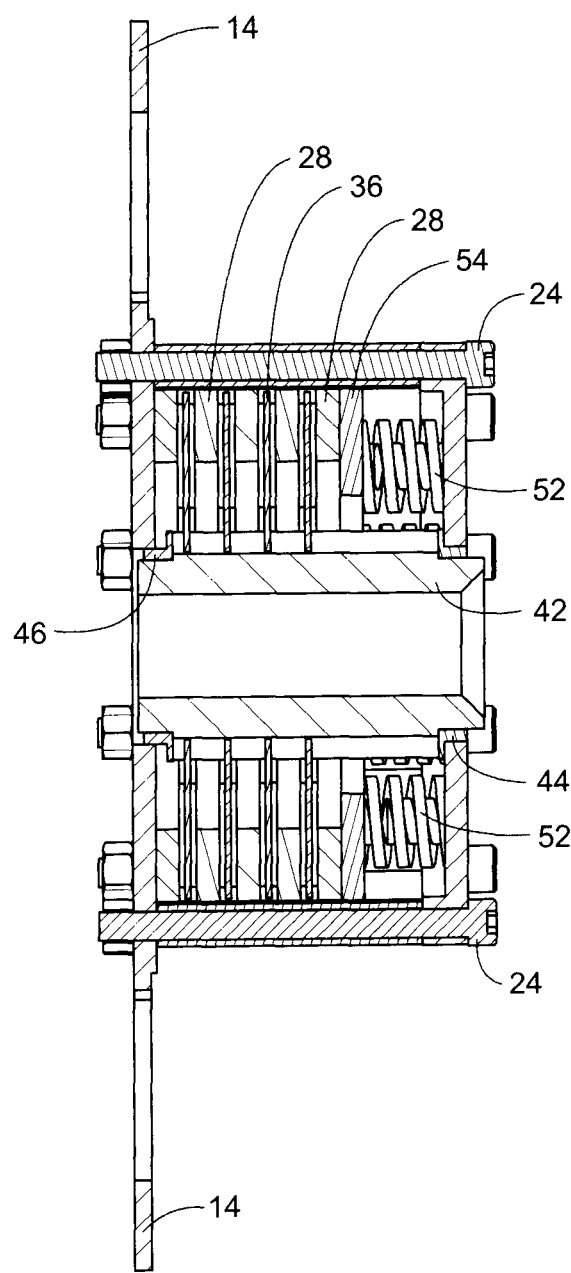
FIG. 7 is a cross sectional view taken along 7-7 of FIG. 1 showing the assembled torque limiting clutch with the flywheel and drive shaft added.

A set of five drive plates 28 are mounted between the backing plate 14 and the pressure plate 22. Each drive plate 28 has ten tabs along its outside circumference with each tab separated by a slot 32. Each of the tabs 28 fit into corresponding channels 34 formed between adjacent drive bars 28 attached to the pressure plate 22. Similarly the drive bars 26 are received in the slots 32 in the drive plates 28. In this manner the drive bars 26, drive plates 28 and backing plate 14 all rotate in unison. FIG. 5 illustrates the "drive" components of the clutch.

Sandwiched between each of the drive plates 28 is a friction plate 36 that consists of a circular metal plate with notches 38 on the inside diameter that interconnect with receiving grooves 40 on a splined center shaft 42. A drive shaft 43 in the stern drive system is received in the center shaft 42 so that it is driven by the center shaft 42. The friction plates 36 have a composite friction material adhered to each side to mate with the metal drive plates 28. The friction plates 36 rotate in unison with the center shaft 42 and independently of the engine's flywheel 16. There are bushings 44 and 46 at either end of the center shaft 42. One bushing 44 is received in a mounting hole 48 centrally located in the pressure plate 22. The other bushing 46 is received in the centrally disposed mounting hole 50 in the backing plate 14. FIG. 6 illustrates the "driven" components of the clutch.

There are eight coil springs 52 that are mounted between the pressure plate 22 and a floating spring plate 54. The coil springs 52 exert a force on the spring plate 54 which presses the five drive plates 28 and four friction plates 36 together. This clamping force is set based on various factors such as engine size, horsepower, torque, drive shaft characteristics and propeller criteria. The clamping force is set so that in normal operating conditions it is sufficient to transmit the engine's torque from the backing plate 14 to the drive plates 28, to the friction plates 36 and out to the center shaft 42 without the drive plates 28 and friction plates 36 slipping with respect to each other.

When an inertia-induced event occurs, the preset static friction limits between the drive plates 28 and the friction plates 36 are exceeded and the drive plates 28 begin to slide with respect to the friction plates 36. This converts the energy from the torque spikes into heat. During this event the torque limiting clutch 12 will continue to transfer the engine's torque to the drive shaft 43 and in turn to the propeller and only the torque spikes will be dampened. Once the torque spike falls below the dynamic friction limits between the drive plates 28 and friction plates 36, the plates will "lock up" and once again transfer 100% of the engine's torque to the drive shaft 43.

The invention can be easily adapted for installation on all types of stern drive watercraft. If only requires that the torque limiting clutch be connected to the engine's flywheel and the output of the clutch be connected to the drive shaft of the drive train. The invention is adaptable to all engine and drive train sizes. The clamping force must be set so that all of the engine's torque is transmitted to the drive shaft during normal operation and the clutch only has slipping between the drive and friction plates when an inertia-induced event occurs. This normally occurs when the propeller leaves the water and re-enters the water resulting in a large force suddenly trying to stop the rotation of the propeller. This can also occur when the propeller strikes an object.

Thus there has been provided a method and apparatus for limiting the torque supplied from an engine to the drive train of a water craft that fully satisfies the objects and advantages set forth herein. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method of reducing torque from an engine to the stern drive of a watercraft comprising the steps of:
   a. attaching a flywheel of the engine to an input portion of a torque limiting clutch;
   b. attaching a drive shaft of the stern drive to an output portion of the torque limiting clutch;
   c. providing a driving rotational force to the input portion of the torque limiting clutch which provides substantially all of the driving force to the output portion and to the drive shaft during normal operation;
   d. limiting the driving rotational force to the drive shaft by means of the torque limiting clutch when the drive shaft experiences a counter rotational force above a predetermined level to reduce the stress on the drive shaft.

2. The method of claim 1 and the further step of establishing the predetermined level based on engine, propeller and drive train parameters to protect the drive train when the predetermined level is exceeded.

3. The method of claim 2 and the further step of adjusting the torque limiting clutch so that it slips and absorbs energy when the drive train experiences the counter rotational force exceeding the predetermined level.

4. The method of claim 2 and the further step of automatically ceasing slipping of the clutch and restoring the transmission of substantially all of the engine's torque to the stern drive when the predetermined level is no longer being exceeded.

5. A method of protecting the drive train of a watercraft comprising:
   mounting a torque limiting clutch between the engine and the stern drive to transmit substantially all of the engine's torque to the stern drive during normal operating conditions when the propeller is freely rotating due to the power provided from the engine and causing the clutch to slip and transfer less than all of the engine's power when the stern drive experiences a force that exceed a predetermined force that will otherwise damage the stern drive.

6. The method of claim 5 and the further step of adjusting the clutch so that it slips and absorbs energy when the stern drive experiences the force exceeding the predetermined force.

7. The method of claim 6 and the further step of establishing the predetermined force based on engine, propeller and stern drive parameters to protect the stern drive when the predetermined force is exceeded.

8. The method of claim 6 and the further step of automatically ceasing slipping of the clutch and restoring the transmission of substantially all of the engine's power to the stern drive when the predetermined force is no longer being exceeded.

* * * * *